US009316038B2

(12) United States Patent
Wilder et al.

(10) Patent No.: US 9,316,038 B2
(45) Date of Patent: Apr. 19, 2016

(54) FACTORY PROGRAMMING OF PAIRED AUTHORIZATION CODES IN WIRELESS TRANSMITTER AND DOOR OPERATOR

(71) Applicant: Overhead Door Corporation, Lewisville, TX (US)

(72) Inventors: Steven E. Wilder, Ashland, OH (US); Tom Deneen, Akron, OH (US); Tim Ikeler, Massillon, OH (US)

(73) Assignee: Overhead Door Corporation, Lewisville, TX (US)

( * ) Notice: Subject to any disclaimer, the term of this patent is extended or adjusted under 35 U.S.C. 154(b) by 226 days.

(21) Appl. No.: 13/944,706

(22) Filed: Jul. 17, 2013

(65) Prior Publication Data

US 2014/0266589 A1 Sep. 18, 2014

Related U.S. Application Data

(60) Provisional application No. 61/798,989, filed on Mar. 15, 2013.

(51) Int. Cl.
*G05B 19/00* (2006.01)
*E05F 15/20* (2006.01)
(Continued)

(52) U.S. Cl.
CPC ............. *E05F 15/2076* (2013.01); *E05F 15/77* (2015.01); *E05Y 2900/106* (2013.01); *G07C 2009/00849* (2013.01); *G07C 2009/00928* (2013.01)

(58) Field of Classification Search
CPC .............................. E05F 15/2076; E05F 15/77
USPC ........... 340/5.22, 5.23, 5.25, 5.26, 5.61, 5.62, 340/5.64, 5.7, 12.5, 12.11, 12.22, 12.23, 340/12.24, 12.28
See application file for complete search history.

(56) References Cited

U.S. PATENT DOCUMENTS 3,676,645 A * 7/1972 Fickenscher et al. ......... 235/437
3,959,629 A * 5/1976 Specht et al. ................. 235/487
4,064,487 A * 12/1977 Russell et al. ............. 340/12.11
(Continued)

OTHER PUBLICATIONS

International Search Report mailed Oct. 9, 2014 in corresponding application No. PCT/US2014/027355, 6 pages.
(Continued)

*Primary Examiner* — Kerri McNally
(74) *Attorney, Agent, or Firm* — Gardere Wynne Sewell LLP

(57) ABSTRACT

Disclosed herein is a process for pairing one or more wireless transmitters with a power head unit of a barrier opening system prior to delivering the system to the end user. In one facility, an authorization code of a wireless transmitter is received and passed to a printer that prints an encoded label with indicia corresponding to the authorization code. The so-encoded label is affixed to the wireless transmitter or its packaging or pallet. In another facility, the encoded label is thereafter scanned, and the authorization code is deciphered and stored in a database. The power head is programmed with the identical code by placing the power head into a learn mode, retrieving the deciphered authorization code from the database, and transmitting the retrieved code to the power head using a test transmitter while the power head is in the learn mode, with the power head thereafter moved out of the learn mode, thereby pairing the transmitter with the power head. The so-programmed power head and wireless transmitter are then packaged for sale and distribution to the end user of the barrier opening system.

14 Claims, 5 Drawing Sheets

(51) Int. Cl.
*E05F 15/77* (2015.01)
*G07C 9/00* (2006.01)

(56) References Cited

U.S. PATENT DOCUMENTS

| | | | | |
|---|---|---|---|---|
| 4,241,540 | A * | 12/1980 | Depperman | 49/199 |
| 4,254,582 | A * | 3/1981 | McGee | 49/199 |
| 4,464,651 | A * | 8/1984 | Duhame | 340/521 |
| 4,529,980 | A * | 7/1985 | Liotine et al. | 340/9.16 |
| 4,535,222 | A | 8/1985 | Moen | |
| 4,750,118 | A * | 6/1988 | Heitschel et al. | 700/90 |
| 4,775,786 | A * | 10/1988 | Yamano et al. | 235/490 |
| 4,819,379 | A * | 4/1989 | Kenzelmann et al. | 49/280 |
| 4,885,872 | A * | 12/1989 | Chang et al. | 49/362 |
| 4,988,922 | A | 1/1991 | Shoda et al. | |
| 4,988,992 | A * | 1/1991 | Heitschel et al. | 340/12.23 |
| 5,010,688 | A * | 4/1991 | Dombrowski et al. | 49/362 |
| 5,028,919 | A * | 7/1991 | Hidaka | 340/12.28 |
| 5,278,547 | A | 1/1994 | Suman et al. | |
| 5,379,453 | A * | 1/1995 | Tigwell | 455/151.2 |
| 5,442,340 | A * | 8/1995 | Dykema | 340/5.25 |
| 5,473,318 | A * | 12/1995 | Martel | 340/5.23 |
| 5,479,155 | A | 12/1995 | Zeinstra et al. | |
| 5,489,763 | A * | 2/1996 | Conrad et al. | 235/384 |
| 5,533,561 | A * | 7/1996 | Forehand, IV | 160/188 |
| 5,583,485 | A | 12/1996 | Van Lente et al. | |
| 5,589,747 | A * | 12/1996 | Utke | 318/468 |
| 5,614,891 | A | 3/1997 | Zeinstra et al. | |
| 5,777,315 | A * | 7/1998 | Wilz et al. | 235/462.15 |
| 5,793,300 | A * | 8/1998 | Suman et al. | 340/13.21 |
| 6,081,203 | A * | 6/2000 | Fitzgibbon | 340/12.23 |
| 6,249,673 | B1 * | 6/2001 | Tsui | 455/92 |
| 6,271,765 | B1 * | 8/2001 | King et al. | 340/12.22 |
| 6,310,548 | B1 * | 10/2001 | Stephens et al. | 340/540 |
| 6,362,771 | B1 * | 3/2002 | Schofield et al. | 341/176 |
| 6,374,543 | B1 * | 4/2002 | Bishai | 49/199 |
| 6,414,587 | B1 * | 7/2002 | Fitzgibbon | 340/5.22 |
| 6,525,645 | B2 * | 2/2003 | King et al. | 340/5.7 |
| 6,529,154 | B1 * | 3/2003 | Schramm et al. | 342/44 |
| 6,597,465 | B1 * | 7/2003 | Jarchow et al. | 358/1.12 |
| 6,667,684 | B1 * | 12/2003 | Waggamon et al. | 340/5.71 |
| 6,756,895 | B2 * | 6/2004 | Study et al. | 340/506 |
| 6,839,133 | B2 * | 1/2005 | Gehring | 356/141.1 |
| 6,847,303 | B2 * | 1/2005 | Hoermann | 340/13.24 |
| 6,873,824 | B2 * | 3/2005 | Flick | 455/41.2 |
| 7,068,181 | B2 * | 6/2006 | Chuey | 340/12.5 |
| 7,135,957 | B2 * | 11/2006 | Wilson | 340/5.61 |
| 7,161,466 | B2 * | 1/2007 | Chuey | 340/5.26 |
| 7,269,416 | B2 * | 9/2007 | Guthrie et al. | 455/420 |
| 7,515,063 | B2 * | 4/2009 | Brundula | 340/6.11 |
| 7,864,070 | B2 * | 1/2011 | Witkowski et al. | 340/12.24 |
| 8,111,133 | B2 * | 2/2012 | Rodriguez et al. | 340/5.7 |
| 8,384,513 | B2 * | 2/2013 | Witkowski | 340/5.26 |
| 8,403,022 | B2 * | 3/2013 | Womacks | 160/201 |
| 8,552,842 | B2 * | 10/2013 | Naval et al. | 340/12.22 |
| 8,810,433 | B1 * | 8/2014 | Aarons | 340/932.2 |
| 8,976,002 | B2 * | 3/2015 | Tsui et al. | 340/5.22 |
| 8,981,898 | B2 * | 3/2015 | Sims et al. | 340/5.71 |
| 8,991,700 | B2 * | 3/2015 | Harbison et al. | 235/383 |
| 2002/0014954 | A1 * | 2/2002 | Fitzgibbon et al. | 340/5.64 |
| 2003/0174045 | A1 * | 9/2003 | Zhang | 340/5.64 |
| 2003/0214385 | A1 * | 11/2003 | Murray | 340/5.23 |
| 2004/0085185 | A1 | 5/2004 | Waggamon et al. | |
| 2004/0257198 | A1 * | 12/2004 | Mullet et al. | 340/5.71 |
| 2004/0257200 | A1 * | 12/2004 | Baumgardner et al. | 340/5.72 |
| 2005/0012631 | A1 * | 1/2005 | Gregori et al. | 340/686.1 |
| 2005/0184854 | A1 * | 8/2005 | Mullet et al. | 340/5.22 |
| 2006/0091842 | A1 * | 5/2006 | Nishiyama | 318/568.11 |
| 2007/0046231 | A1 * | 3/2007 | Mullet et al. | 318/280 |
| 2007/0046232 | A1 * | 3/2007 | Mullet et al. | 318/280 |
| 2007/0167138 | A1 * | 7/2007 | Bauman et al. | 455/41.2 |
| 2007/0185597 | A1 * | 8/2007 | Bejean et al. | 700/83 |
| 2008/0062000 | A1 * | 3/2008 | Styers et al. | 340/686.1 |
| 2008/0079570 | A1 * | 4/2008 | Fineman et al. | 340/545.1 |
| 2008/0164973 | A1 * | 7/2008 | Mamaloukas | 340/5.7 |
| 2009/0096606 | A1 * | 4/2009 | Janov et al. | 340/540 |
| 2010/0060505 | A1 * | 3/2010 | Witkowski et al. | 341/176 |
| 2010/0297941 | A1 * | 11/2010 | Doan et al. | 455/41.2 |
| 2011/0311052 | A1 * | 12/2011 | Myers et al. | 380/270 |
| 2012/0163599 | A1 * | 6/2012 | Ware et al. | 380/270 |
| 2013/0328663 | A1 * | 12/2013 | Ordaz | 340/5.62 |
| 2014/0184080 | A1 * | 7/2014 | Rybicki et al. | 315/122 |

OTHER PUBLICATIONS

Written Opinion mailed Oct. 9, 2014 in corresponding application No. PCT/US2014/027355, 7 pages.

* cited by examiner

FACTORY PROGRAMMING OF PAIRED AUTHORIZATION CODES IN WIRELESS TRANSMITTER AND DOOR OPERATOR

This non-provisional application claims the benefit of the priority filing date of U.S. Provisional Application No. 61/798,989, filed Mar. 15, 2013, the disclosure of which is adopted herein in its entirety.

FILED OF THE INVENTION

This invention pertains to barrier opening systems, more particularly to garage door opening systems, and even more particularly to the pairing of wireless transmitters with the door operator of a garage door opening system.

BACKGROUND

Barrier opening systems, particularly garage door opening systems, present numerous issues for operation. Present day garage door opening systems include, inter alia, remotely located wireless signal transmitters (for wirelessly generating door instruction signals); a garage door operator, usually of the ceiling-mounted power head type, or of the jackshaft type, with a wireless signal receiver, microcontroller or similar computer processor, associated memory, and a motor controller (for respectively receiving, storing, and processing the wireless transmitter door instruction signals, and generating motor control signals corresponding thereto); and a motor mechanically coupled with the door (for opening, closing, and/or halting movement of, the garage door in response to the respectively generated motor control signals.)

Wireless transmitters include those that are hand-held, automobile mounted, and/or mounted on the interior and/or exterior walls of the garage. As generally known, the user typically selectively depresses buttons or switches on the transmitter to activate and send these door instruction signals to the door operator, the signals normally encoded in a manner to avoid their capture by codegrabbers. These door instruction signals will hereinafter be referred to in the specification and claims as "encoded access control signals."

To prevent the door operator from responding to a neighbor's or a stranger's unauthorized transmitter, the door operator is typically programmed by the user to respond to encoded access control signals from only authorized transmitters. This is typically accomplished by the transmitter user initially transmitting a code for storage in the door operator's memory that corresponds to the authorization code stored in each transmitter that is to be authorized to communicate with that door operator. This procedure thereby establishes the exclusive pairing of the door operator with only those transmitter(s) that are authorized to communicate with it. Therefore, the term "authorization code" shall be defined, and referred to throughout the specification and claims, as a code that (i) is identical to a code that is stored in both the door operator and in each transmitter that is to be paired, and therefore authorized to communicate, with the door operator, and (ii) must be stored in the door operator and in such authorized transmitter(s) before the door operator can be operative to move the door in response to door instruction signals transmitted by such transmitter(s).

Currently, the typical approach for programming the authorization codes in the door operator is for the end user or installer of the door operator, prior to its operation, to place its microcontroller into the "learn" mode, and then actuate a wireless transmitter in which the authorization code has been stored, to transmit the identical code for storage within the door operator's memory, thus establishing the desired pairing between that transmitter and the door operator. After such pairing operation with respect to all transmitters to communicate with that door operator, the door operator's microcontroller is moved out of its "learn" mode to its "operate" mode, and the door operator is ready for operation.

While this method is designed to accomplish the intended purpose—pre-operation operator/transmitter pairing, there are disadvantages from the standpoint of user convenience. For example, experience has shown that the programming instructions regarding this initial pairing operation have tended to confuse the end user, resulting in the operator not being programmed with an authorization code, therefore being inoperative, and the end user falsely concluding that the non-operative garage door closing system is defective. Thus, it is the principal purpose of this invention to provide a new and improved, and more reliable, method of pairing authorized wireless transmitters with their designated door operator, and without user inconvenience or confusion.

SUMMARY

Accordingly, the principal aspect of the method described herein is to pair one or more selected wireless transmitters with the door operator, by pre-programming the authorization code(s) of each transmitter into the door operator that are to be authorized to communicate with such operator, prior to the installation and/or use of the door opening system by the end user. In particular, this pairing or pre-programming is effected at the factory as part of the overall manufacturing process.

In accordance with a specific embodiment of this method, one or more assembled wireless transmitters, pre-programmed during their manufacture with their respective unique authorization code, are selected for pairing with a garage door operator of the power head type while still at the factory. Coded information representative of these authorization codes are then stored in a database for subsequent transfer to, and pre-programming of, the power head unit. The power head is thereafter moved into its "learn" mode, and the stored authorization codes in the database are retrieved and transmitted for storage within the power head, all within the factory environment. The door operator is consequently paired with all the selected wireless transmitters containing the respective authorization code(s), and the pre-programmed transmitters and paired pre-programmed door operator are packaged together and shipped for eventual distribution to the end user, who may now proceed with the installation and operation of the door operator without the need for any pre-operation pairing.

In accordance with a particular feature of this embodiment, the actuation of the door operator between the "learn" and "operate" modes may be effected mechanically (e.g., manually). Alternatively, a manufactured transmitter can transmit three different sequential code commands to the power head, a first code command instructing the power head to move into the "learn" mode, a second code command, instructing the microprocessor to retrieve the authorization code(s) of the manufactured transmitters from the database and transmit them for storage in the power head's memory, and a third code command, returning the power head to the "operate" mode.

The foregoing and other details and features, as well as the advantages, of the disclosed method will become more readily understood and apparent from the following detailed description, taken in conjunction with the accompanying drawings. The detailed description and drawings are merely illustrative of embodiments of the underlying invention, the scope of the invention being defined solely by the appended claims and equivalents thereof.

BRIEF DESCRIPTION OF DRAWINGS

Embodiments illustrated by way of example in the accompanying drawings are not necessarily drawn to scale, and certain portions may be exaggerated in order to emphasize certain features. Accordingly.

DETAILED DESCRIPTION OF THE METHOD

The terms “power head” and “power head unit,” as used in the specification and claims, refer to, and are defined, as an enclosed garage door operator, typically suspended from the garage ceiling, and including a receiver, memory, controller, motor controller, and motor respectively carrying out the defined functions (e.g., the storage of codes in the power head unit means the storage of codes in the unit’s memory.)

Figure 1:
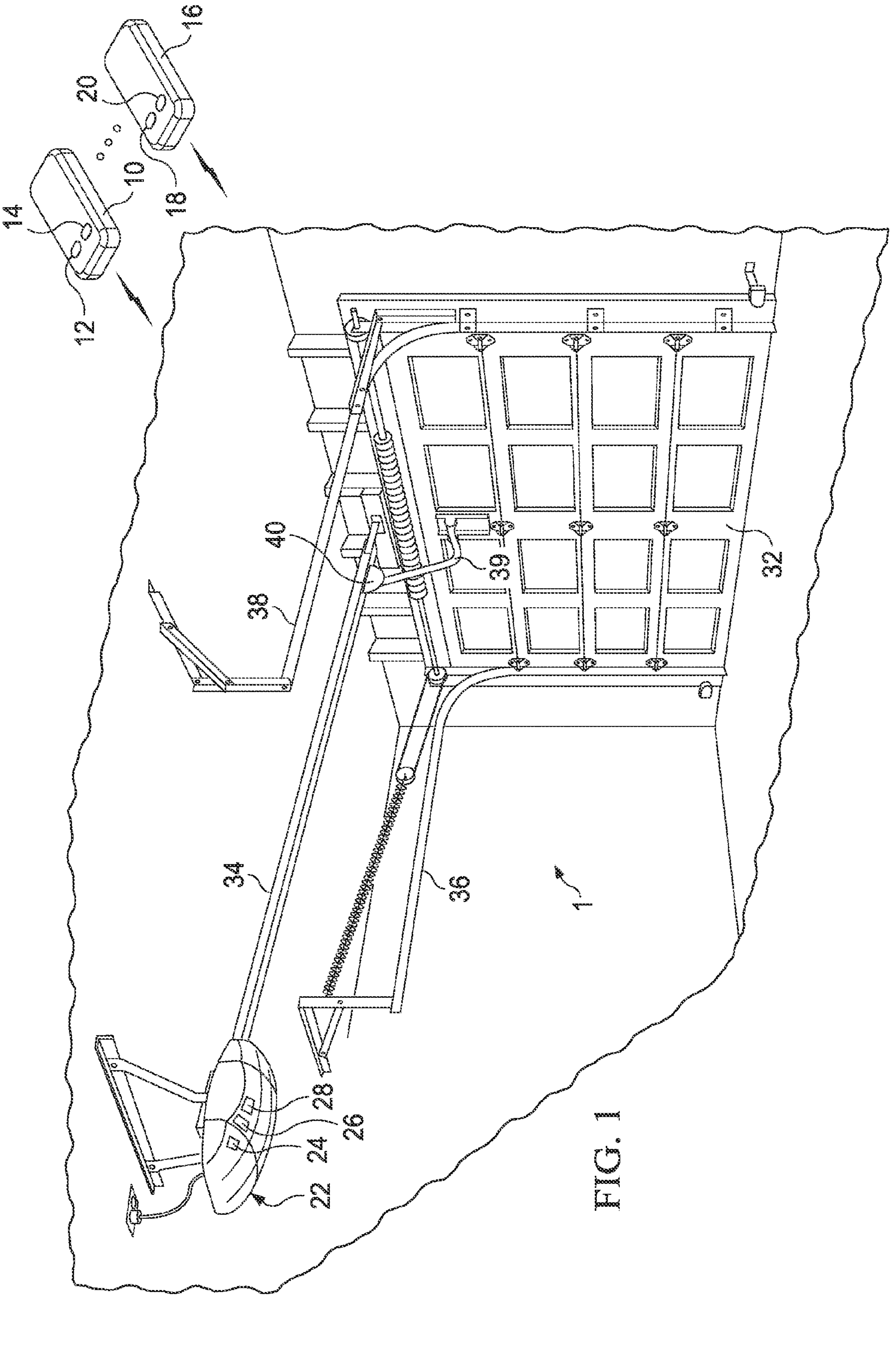
FIG. 1 is a diagram of a typical garage door opening system.

Referring initially to FIG. 1, a typical garage door opening system 1 utilizing a door operator of the power head type is depicted. This system 1 is generally known in the art and may be the same as, or similar to, the one described and illustrated in U.S. Pat. No. 6,634,408 (“the ’408 patent”), assigned to the assignee of the present invention, the details of which are incorporated herein by reference for all purposes. In accordance with the system depicted in FIG. 1, a power head unit 22 is attached to the garage ceiling and encloses and constitutes the “brains” of the garage door operator, receiving instructions from user-operated wired and wireless barrier-opener wall consoles (not shown) affixed at the interior and exterior of the garage, as well as from remotely located wireless RF transmitters, for example of the hand-held type shown in the drawing of FIG. 1 as items 10 and 16.

Figure 2:
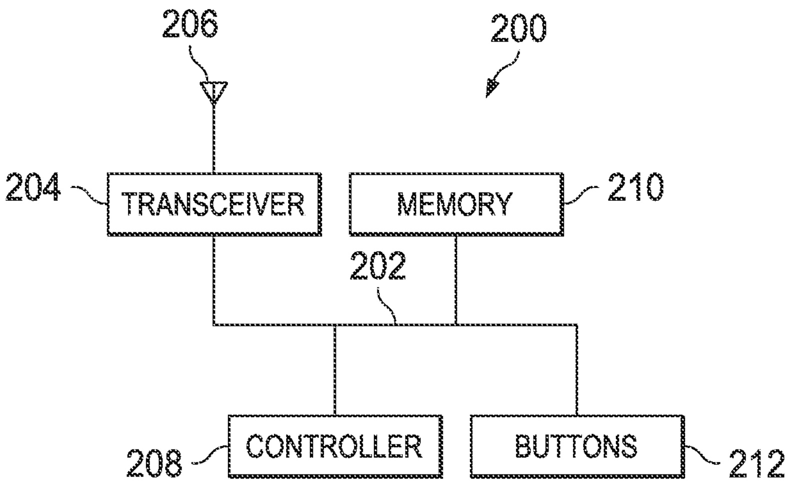
FIG. 2 is a block diagram of a wireless transmitter for a garage door opening system, according to one embodiment thereof.

Accordingly, as generally known in the industry, and as illustrated in FIG. 2, each wireless transmitter 10 or 16 typically has the configuration 200 and includes a memory 210 (for storing the codes determining the signals to be transmitted by transceiver 204 from the antenna 206.), a controller 208, which may be a microprocessor, microcontroller, or the like, that responds to the depression of buttons/switches 212 (corresponding to buttons 12,14,18 & 20 in FIG. 1) by the user to transmit the wireless RF door instruction signals corresponding to the stored codes, instructing the movement of the garage door.

Figure 3:
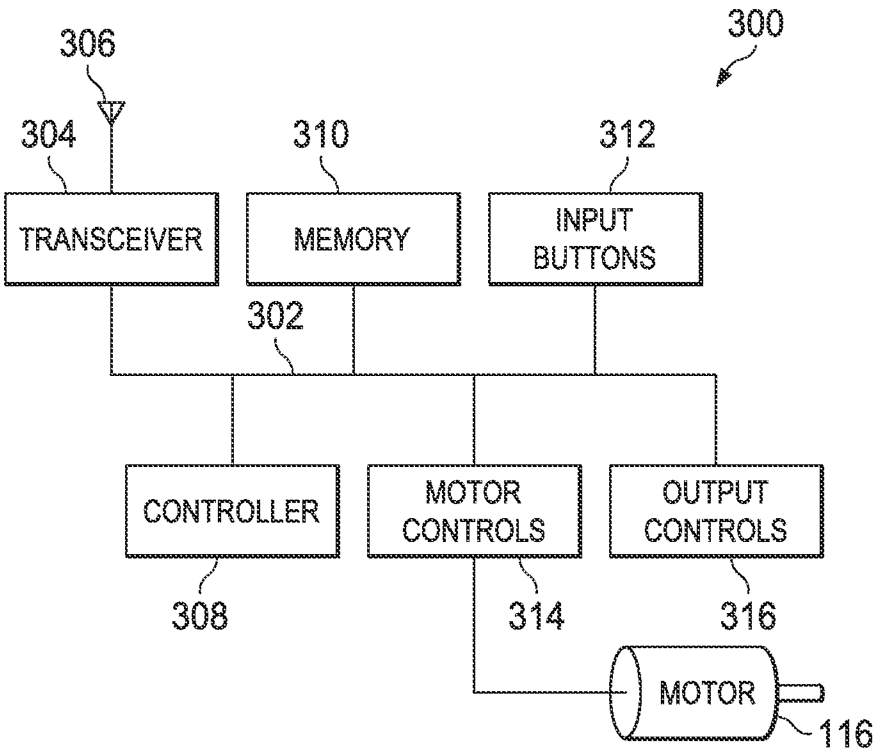
FIG. 3 is a block diagram of a garage door operator of the power head type for a garage door opening system, according to one embodiment thereof.

Also, as generally known in the industry, and as illustrated in FIG. 3, a power head unit 22 typically has the configuration 300 and includes a wireless signal receiver (or transceiver) 304 for receiving the wireless transmissions from transmitters 10 and 16 by way of antenna 306, a controller 308, which typically may be a programmable microprocessor, microcontroller, or the like, for storing incoming coded data in associated memory 310, and for processing the incoming door instruction signals to regulate the operation of motor 116 by way of motor controller 314.

Under such controls, the motor 116 is effective to drive an endless chain (not shown) or other connector, like a belt or screw, along rail 34. The chain is operably connected through carriage 40 to one end of link 39, link 39 attached at its opposed end to the door 32. Accordingly, as a consequence of the motor driving the endless chain, garage door 32 would be moved between open and closed positions, the door guided along spaced tracks 36 and 38.

As conventionally known in the art, the signals from wireless transmitters 10 and 16 are generally in a certain frequency range (e.g., 300-400 MHz) and typically include an initial authorization code portion followed by an encrypted access control code portion. While various types of coding formats may be used for these signals, in the specific embodiment now described, these signals are of the type currently used by Overhead Door Corporation and Genie, and known in the industry by the INTELLICODE I® trademark. The details of this coding structure are described in U.S. Pat. No. 6,049,289 (“the ’289 patent”), assigned to the assignee of the present invention, and incorporated herein in its entirety. In such coding, the authorization code comprises (i) a unique transmitter identification code, namely the transmitter serial number, and (ii) one or more function codes, specifically button values of the transmitter, and the encoded access control code portion is a randomly generated multi-bit hopping code Alternatively, the authorization code may refer to any specific identifier value of a transmitter, represented, for example, as a binary, hexadecimal, numeric, alphanumeric, or other known (or to be known) form. The transmitted signals may also include serialized quick turn programming (“SQTP”) data, one or more algorithmic routines, controller-specific keys (i.e., values specific to a particular PICO controller or microcontroller), or the like. SQTP data may be used and programmed, for example, by a PICO microcontroller.

In order for the garage door opening system 1 to operate as intended, the authorization codes that are resident in the transmitters 10 and 16 must be identical to the corresponding codes that are resident in the garage door operator power head unit 22. In particular, and relevant to the process described herein, the authorization code associated with each transmitter that is to be paired with a specific power head unit must have an identical authorization code stored in the power head unit (i.e., in its memory) in order to enable operation of the garage door opening system 1. Indeed, it is this matching that enables the operation of the door operator, whether the door operator is of the described power head type, jackshaft type, or otherwise. As explained above, existing methods of achieving this pairing required the user or the installer to program these codes after the equipment left the factory and was delivered to the user.

However, in accordance with the method of the invention, the required pairing is carried out prior to the delivery of the garage door operator to the user, and specifically at the factory, as part of the overall door opening system manufacturing process. Accordingly, with reference to FIG. 4, one embodiment of the process of this invention for effecting this pairing is now described. Environment 452 represents a manufacturing or factory facility, or a portion of a manufacturing or factory facility, where a constructed wireless transmitter 402, representative of those to be paired with a particular power head unit, is pre-programmed with an authorization code. Environment 400 represents a separate manufacturing or factory facility, or a different portion of the same manufacturing or factory facility, where this authorization code is pre-programmed into the door operator power head.

Accordingly, and as schematically illustrated, transmitter 402 sequentially proceeds through three different stations along production path 450 in environment 452. At the first station, transmitter 402 has its authorization code pre-programmed into its memory. While any format of authorization code may be used, in accordance with the use of the INTELLICODE I® format of this embodiment, the authorization would include (i) as a unique transmitter identification code, the serial number portion of the INTELLICODE® signal, and (ii) a function code, namely the button values of the INTELLICODE® signal. Transmitter 402, after such pre-programming, is then advanced to a second station where, by depression of buttons 404 & 406, the authorization code is wirelessly transferred to a wireless receiver unit 418, the authorization code data thereafter routed from the receiver 418 to a printer 420.

Transmitter 402 is then advanced to a third position, where printer 420 prints a label 428 with appropriately encoded indicia (e.g., bar code data) corresponding to the received authorization code. The so-encoded label is then attached to the transmitter 402 that is to be paired with power head unit 408, to the packaging for transmitter 402, and/or to a pallet upon which the transmitters that have been selected to be paired with a particular power head unit are placed. It is to be understood that printer 420, instead of printing a label with the coded data, may alternately print the encoded indicia directly on the transmitter 402 itself in the field 428.

The transmitter 402, with the encoded data so applied, is thereafter moved to a different manufacturing or factory environment 400 where a scanner 422 scans the printed indicia on the transmitter (or label) corresponding to the authorization code. The scanned authorization code, under control of computing device 424, is then transmitted by way of network 430 to server 432 for storage in its database 434. Network 430 may be, without limitation, one or more local area networks ("LANs"), wide area networks ("WANs"), private virtual networks ("PVNs"), public networks, or the like, currently known to persons of ordinary skill in the art. Such are commonplace in enterprise—wide computer networks, intranets, and the Internet.

The computing device 424 may be, without limitation, one of the many different types of computer processors known to those of ordinary skill in the art, such as a programmable microcontroller, with associated memory. Receiver 418 may be a portion of a standalone control device or may be controlled by the computing device 424.

Figure 4:
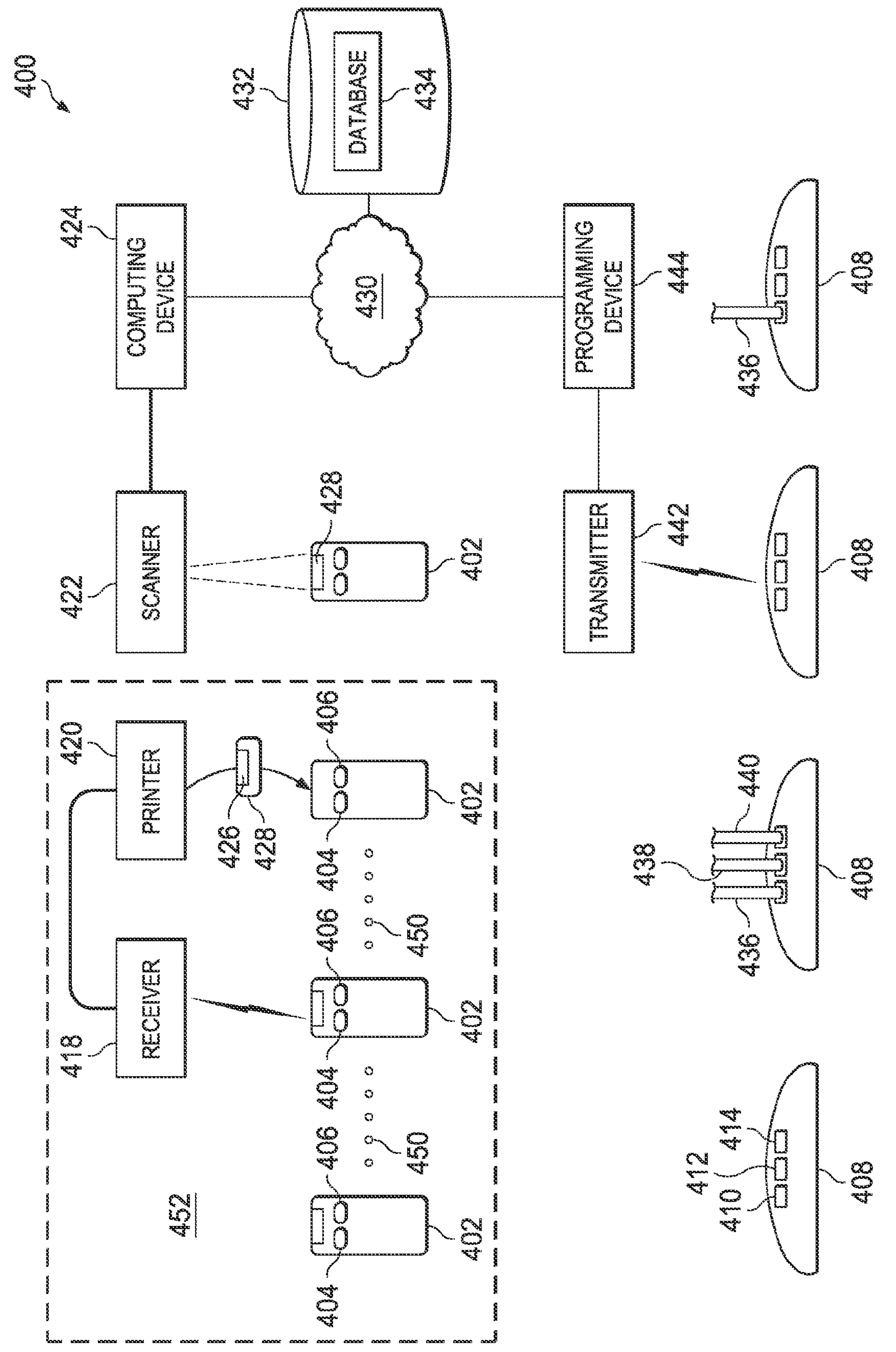
FIG. 4 is a block diagram illustrating a method for pre-programming at the factory a power head type garage door operator as part of the overall manufacturing process so as to pre-pair selected wireless transmitters with the power head prior to delivery of the system to the customer.

Referring still to FIG. 4, power head unit 408 represents the unit to which transmitter 402 is to be paired, and is schematically depicted in different stages. Accordingly, in the first stage, power head unit 408 is depicted with program buttons/switches 410, 412 and 414 (respectively corresponding to buttons/switches 24, 26, and 28 of FIG. 1), the selective depression of which either moving the power head processor into the learn mode from the operate mode, or out of the learn mode back to the operate mode, as subsequently described. Accordingly, in the next stage (second depiction of power head 408), mechanical arms 436, 438 and 440 respectively depress buttons/switches 410, 412 and 414, thereby placing the power head 408 into its learn mode. Under the control of programming device 444, each authorization code(s) is then retrieved from database 434 by way of network 430, routed to transmitter 442, and at a next stage, the transmitter 442 is actuated to transmit each authorization code (i.e., the unique transmitter identification code and the function code) to the power head unit 408, for storage in the power head unit's memory.

In a final stage, mechanical arm 436 depresses button/switch 410 to move the power head unit 408 out of learn mode and into the operate mode. The so programmed power head unit 408, and all of the other wireless transmitters 402 that have their authentication programmed for pairing with the power head unit 408, are then packaged together and shipped from the manufacturing facility 400 for eventual distribution to the end user. Given that the power head unit 408 and all the packaged transmitters have been pre-paired with matching authorization codes, the end user then only needs to unpackage the components, and the garage door operator is ready for operation without any further pairing required.

Figure 5:
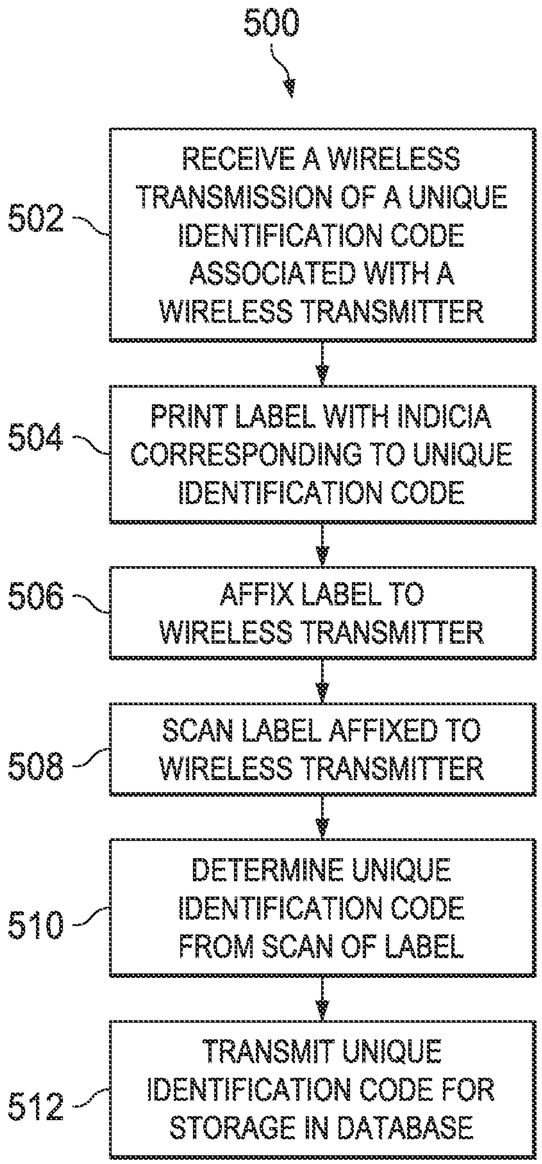
FIGS. 5 & 6 are flow charts of the method illustrated in FIG. 4.
Figure 6:
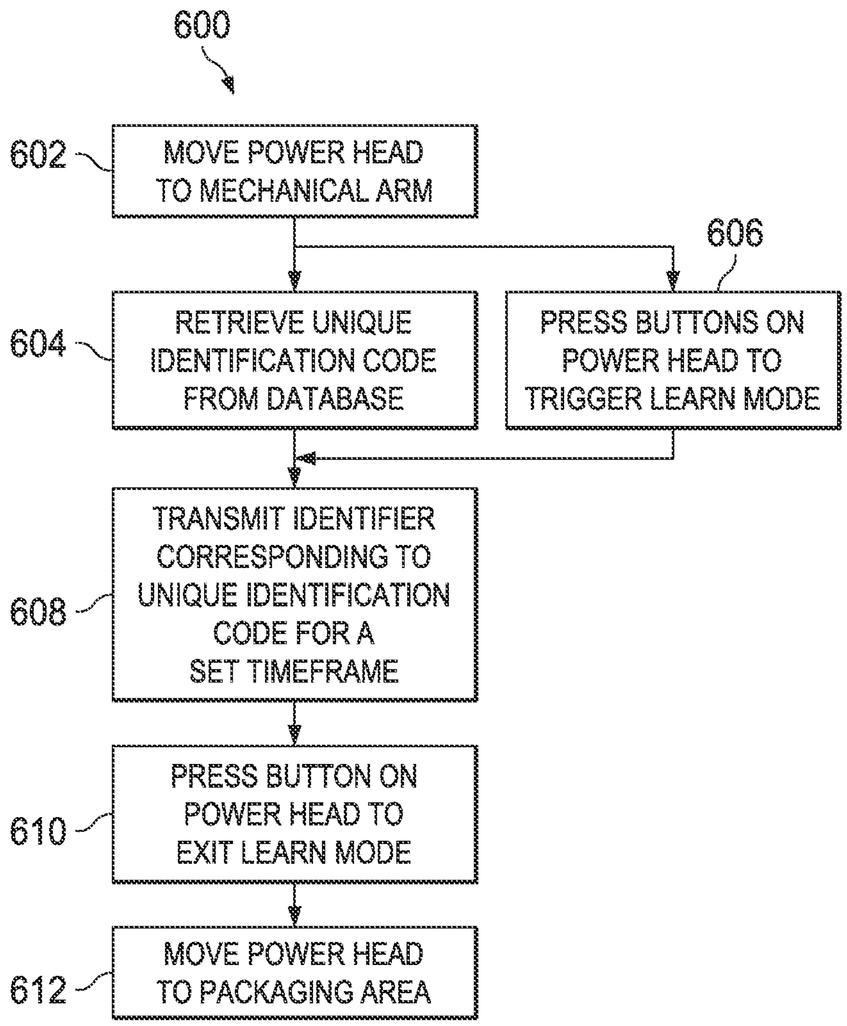

FIG. 5 is a flow chart representation 500 of the steps by which the computing device 424 may be programmed, with steps 502, 504, 506, 508, 510 and 512 respectively corresponding to the previously described sequential functions with respect to transmitter 402. FIG. 6 is a flow chart representation 600 of the principal steps 602, 604, 606, 608, 610 and 612 respectively corresponding to the previously described sequential functions with respect to power head unit 408.

Various modifications to the previously described embodiment may be made by one of ordinary skill in the art without departing from the principles of the method of the invention. For example, while the placement of the power head unit 408 into and out of the "learn" mode has been effected by the manual depression of buttons/switches on the power head, such may also be accomplished by the remote transmission of a plurality of sequential signal codes, each code respectively and sequentially placing the power head into the learn mode, transferring and storing of the authorization code, and moving the power head out of the learn mode back to its operating mode.

Also, while receiver 418, printer 420, scanner 422, computing device 424, server 432, test transmitter 442, and programming device 444 are depicted as separate equipment, some or all of these components may be included in a single item of equipment. Also, indicia 426, while disclosed as being in bar code format, may alternatively be in other coded formats, such as infrared marking, radio frequency identification coding ('RFID"), alphanumeric identifier, watermark, or other graphic marking indicating the authorization code. Moreover, instead of affixing a printed label that is thereafter scanned, a suitable alternative may be to simply transmit the authorization code received by receiver 418 directly to server 432 for storage in database 434.

Various other modifications and additions to the disclosed embodiment will become apparent to those of ordinary skill in the art without departing from the spirit and scope of the invention as defined solely by the appended claims.

What is claimed is:

1. A method for producing at a factory installation a garage door opening system of the type having a wireless transmitter for transmitting instructions and a garage door operator for receiving and responding to said instructions, the garage door operating including a power head unit, said method comprising:

- programming an authorization code into said wireless transmitter;
- retrieving the authorization code from a database;
- selectively placing the power head unit into its learn mode via one or more mechanical arms pressing one or more buttons on the power head unit;

programming a code into said garage door operator at said factory installation that is identical to said authorization code, thereby pairing said wireless transmitter with said garage door operator, by directing a transmitter in the factory installation to transmit the retrieved authorization code for storage in memory in the power head unit; and thereafter moving the power head unit out of the learn mode, and packaging said wireless transmitter with said so-programmed garage door operator after said pairing and prior to delivery of the garage door opening system for use by an end user.

2. The method of claim 1, further comprising:

receiving a wireless transmission of the authorization code from the wireless transmitter;

printing coded indicia corresponding to the authorization code on the transmitter;

scanning the coded indicia to produce a replication of the authorization code; and storing the replication of the authorization code in a database.

3. A system in a manufacturing environment for manufacturing and programming barrier moving power head units to be controlled by signals of wireless transmitters, the system comprising:

a server having a database that stores an authorization code of a wireless transmitter;

at least one mechanical arm configured to physically press one or more buttons on a power head unit to place a power head unit into a learn mode; and a programming device configured to retrieve the authorization code from the database of the server, via communication with the server over a network, and direct a test transmitter to transmit the authorization code while the power head unit is in the learn mode.

4. The system of claim 3, wherein the programming device directs the test transmitter to stop transmitting the authorization code when the at least one of the one or more buttons are physically pressed to switch the power head unit from the learn mode to an operating mode.

5. The system of claim 4, further comprising:

a receiver configured to receive the authorization code of the wireless transmitter;

a printer configured to generate a label with an indication of the authorization code, wherein the label is affixed to the wireless transmitter;

a scanner configured to scan the label affixed to the wireless transmitter; and a computing device configured to ascertain the authorization code from a scan of the label affixed to the wireless transmitter.

6. The system of claim 3, wherein the database stores a plurality of unique identification codes for a plurality of wireless transmitters, each of the unique identification codes comprising a serial number and one or more secret keys for a pair of wireless transmitters.

7. The system of claim 6, wherein the test transmitter comprises a low-powered personal area network wireless transmitter capable of wirelessly transmitting the unique identification code to the power head unit.

8. The system of claim 5, further comprising one or more pallets carrying the wireless transmitters to a transmitter learning station where respective authorization codes are received and transmitted to the database and corresponding labels are affixed to the wireless transmitters.

9. A method of a providing barrier moving power head unit having multiple wireless transmitters paired thereto comprising:

in a factory, prior to sale and delivery of the barrier moving power head unit to a customer:

programming a single authorization code into memories of multiple wireless transmitters;

applying a machine readable representation of the single authorization code to exteriors of the multiple wireless transmitters;

reading the single authorization code from the exteriors of the multiple wireless transmitters and storing the single authorization code in a database of a server;

retrieving the single authorization code from the database and storing the single authorization code into memory of the barrier moving power head unit; and packaging the multiple wireless transmitters and the barrier moving power head unit in a single package, thereby enabling installation and use of the barrier moving power head unit by the customer without the customer pairing the multiple wireless transmitters to the barrier moving power head unit.

10. The method of claim 9, wherein applying the machine readable representation of the single authorization code to exteriors of the multiple wireless transmitters comprises applying labels having marking indicia representing the single authorization code to the exteriors of the multiple wireless transmitters.

11. The method of claim 10, wherein the marking indicia comprises alphanumeric characters and/or a barcode and/or infrared marking indicia.

12. The method of claim 9, wherein applying the machine readable representation of the single authorization code to exteriors of the multiple wireless transmitters comprises applying RFID devices having the single authorization code stored therein to the exteriors of the multiple wireless transmitters.

13. A method for producing at a factory installation a garage door opening system of the type having a wireless transmitter for transmitting instructions and a garage door operator for receiving and responding to said instructions, the garage door operating including a power head unit, said method comprising:

programming an authorization code into said wireless transmitter;

receiving a wireless transmission of the authorization code from the wireless transmitter;

printing coded indicia corresponding to the authorization code on the transmitter;

scanning the coded indicia to produce a replication of the authorization code;

storing the replication of the authorization code in a database;

retrieving the authorization code from the database;

placing the power head unit into its learn mode;

programming a code into said garage door operator at said factory installation that is identical to said authorization code, thereby pairing said wireless transmitter with said garage door operator, by directing a transmitter in the factory installation to transmit the retrieved authorization code for storage in memory in the power head unit; and thereafter moving the power head unit out of the learn mode, and packaging said wireless transmitter with said so-programmed garage door operator after said pairing and prior to delivery of the garage door opening system for use by an end user.

14. The method of claim 13, wherein said power head unit is placed into said learn mode by a remotely generated wireless signal.

* * * * *